(12) United States Patent
Burg et al.

(10) Patent No.: US 10,652,117 B2
(45) Date of Patent: May 12, 2020

(54) AUTOMATION OF CUSTOMER SUPPORT SORTING PROCESS

(71) Applicant: Comcast Cable Communications, LLC, Philadelphia, PA (US)

(72) Inventors: Bernard Burg, Menlo Park, CA (US); Ranjit Padmanabhan, Saratoga, CA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 270 days.

(21) Appl. No.: 15/428,397

(22) Filed: Feb. 9, 2017

(65) Prior Publication Data
US 2018/0227420 A1    Aug. 9, 2018

(51) Int. Cl.
| | |
|---|---|
| H04L 12/26 | (2006.01) |
| H04M 3/523 | (2006.01) |
| H04N 21/25 | (2011.01) |
| H04L 12/24 | (2006.01) |
| H04N 21/488 | (2011.01) |
| H04M 3/51 | (2006.01) |

(52) U.S. Cl.
CPC .......... *H04L 43/08* (2013.01); *H04L 41/507* (2013.01); *H04L 41/5032* (2013.01); *H04L 41/5064* (2013.01); *H04M 3/5238* (2013.01); *H04N 21/251* (2013.01); *H04M 3/5183* (2013.01); *H04M 2203/2077* (2013.01); *H04M 2203/551* (2013.01); *H04N 21/4882* (2013.01)

(58) Field of Classification Search
CPC . H04M 3/5183; H04M 3/5238; H04M 3/5158
See application file for complete search history.

(56) References Cited

U.S. PATENT DOCUMENTS

| | | | |
|---|---|---|---|
| 8,223,953 B2 | 7/2012 | Houmaidi et al. | |
| 8,488,774 B2 | 7/2013 | Mahalaha et al. | |
| 8,824,655 B2 | 9/2014 | Bobba et al. | |
| 9,467,567 B1* | 10/2016 | Barkan .................. | G06Q 10/00 |
| 2008/0118052 A1* | 5/2008 | Houmaidi ........... | H04M 3/5232 379/265.11 |

* cited by examiner

*Primary Examiner* — Nafiz E Hoque
(74) *Attorney, Agent, or Firm* — BakerHostetler

(57) ABSTRACT

Systems and methods for automation of a customer support sorting process are described. A probability that a call from a potential caller will be received by a call system may be determined based at least in part on historical status information and call history information. The historical status information may indicate one or more past operational states of a service network. The call history information may indicate one or more calls received by the call system, as well as a subject matter of each of the one or more calls. If the determined probability satisfies a threshold, a notification to the potential caller may be transmitted. The notification may inform the potential caller of a current operational state of the service network.

20 Claims, 9 Drawing Sheets

AUTOMATION OF CUSTOMER SUPPORT SORTING PROCESS

BACKGROUND

Customer call centers may be used by companies or businesses to afford customer service to their users. For example, users may call a customer call center to modify a service plan, inquire about a bill, or report a problem with a service or product. Operating a call center may entail considerable costs, such as personnel and equipment costs. Moreover, as the number of calls received by the call center increases, the burden of processing increases and may cause delay in customer service. These and other shortcomings of the art are addressed by the present disclosure.

SUMMARY

Systems and methods are described for determining (e.g., predicting) whether a caller will contact a call system responsive to an operational state of an associated service network. Based on the determination, a notification may be transmitted to the caller indicating the operational state of the service network. The notification may be transmitted and received before the caller contacts the call system, thereby minimizing a call volume at the call system due to the operational state. Although the term "call" is referenced throughout the disclosure, it is understood that call may comprise various communication methods such as voice (e.g., telephonic) communication, messaging, chat sessions, video conference, and the like.

Notifications and/or call routing may be based on a set of rules. For example, a set of rules may be determined to predict which of a plurality of service paths a communication to a call system should be classified. The set of rules may be determined according to historical operational states of a service network and/or historical usage of the call system. For example, the historical operational states of the service network may be correlated or otherwise associated with the historical usage of the call system to determine the set of rules. A current communication to the call system may be classified, and routed accordingly within the call system, using the determined set of rules.

BRIEF DESCRIPTION OF DRAWINGS

The accompanying drawings, which are incorporated in and constitute a part of this specification, show example implementations and together with the description, serve to explain the principles of the methods and systems.

DETAILED DESCRIPTION

Figure 1:
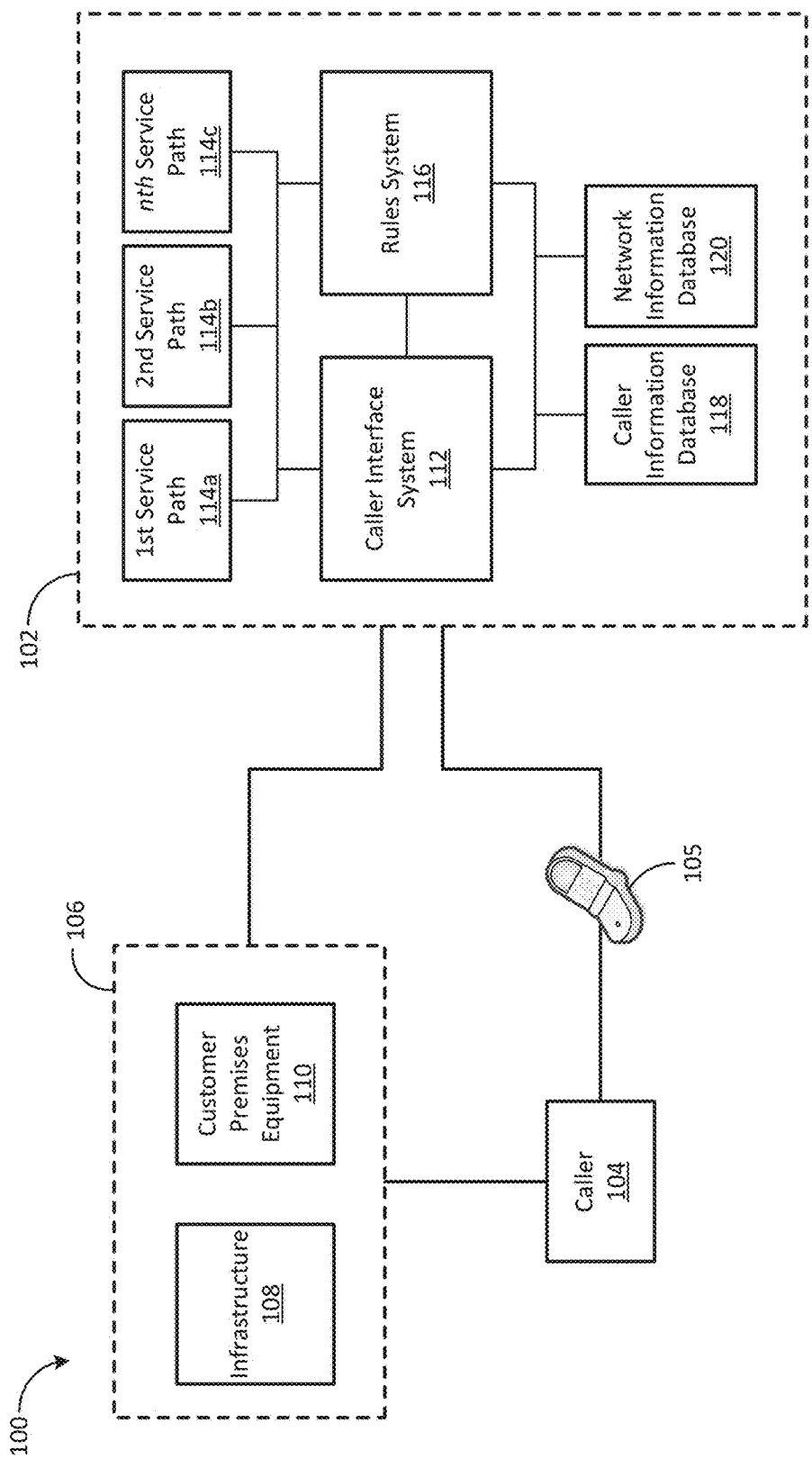
FIG. 1 shows a schematic diagram of an example system and network.

Systems and methods are described for predicting whether a call system will receive a communication (e.g., a call) from a potential caller. This prediction may be based on a past and/or present operational state of a service network. This prediction may be based on a profile of the caller reflecting the communication habits of the caller with respect to the call system. For example, some callers may call to report a problem or interruption as soon as it is experienced. Other callers, for example, may rarely call to report a service interruption or only call for certain types of service interruptions. If it is predicted with sufficient certainty that a potential caller is likely to contact the call system, a pre-emptive notification may be transmitted to the caller's user device.

The subject matter or other classification of a communication (e.g., a call) received by a call system may be predicted. The communication may be routed (e.g., via one or more service paths) within the call system based on the predicted subject matter or other classification of the communication.

As one example, predicting whether the call system will receive a communication (e.g., a call) from a source associated with a potential caller may be implemented by determining a call probability that the call system will receive the communication from the source associated with the potential caller. The call probability may be determined based on status information indicating a past operational state of a service network. For example, the status information may comprise error data indicating an interruption to an operation of the service network. As one example, such error data may be generated when a set top cable box experiences data packet loss negatively affecting the cable television display. The call probability may be determined based on call history information indicating one or more past communications received by the call system. If the call probability satisfies a pre-determined threshold (e.g., it is satisfactorily likely that the potential communications will be received), a notification may be transmitted to the source associated with the potential caller. The notification may indicate a current operational state of the service network. For example, the notification may indicate that a particular service interruption has occurred and that the service network is working to resolve the interruption.

As another example, a set of rules for predicting whether a potential caller will contact the call system may be determined using a machine learning technique. The set of rules may be determined by the machine learning technique using a set of training data comprising status information from a service network, call information reflecting past communications (e.g., calls) to the call system, and/or a caller behavior profile. The status information from the service network may comprise, for example, one or more error message signatures and/or operational states of various components of the service network. The status information from the service network may be correlated or otherwise associated with the call information to identify conditions within the service network that precipitated a communication to the call system. The caller behavior profile may reflect, for example, a tendency for a caller to call the call system or an average time that the caller waits before calling. The set of rules may be translated into a set of human-readable rules so that the rules may be analyzed and potentially modified by a human user.

The set of rules for predicting whether a potential caller will contact the call system may be implemented in a live calling environment by a rules engine. The rules engine may implement this set of rules by monitoring the current operational state of the service network and determining whether a potential caller is predicted to contact the call system based on the current operational state of the service network and the caller behavior profile associated with the potential caller. Based on the prediction, the call system may transmit a pre-emptive notification to the potential caller's user device to address the circumstance before the caller has a chance to contact the call system.

A set of rules for predicting the subject matter of a communication (e.g., a call) to the call system may be determined using a machine learning technique. For example, the machine learning technique may comprise determining a separate machine learning algorithm for each potential subject matter to which a communication may be classified. Each separate learning algorithm may be based on status information from the service network and call information representing past communications to the call system. The separate learning algorithms may be merged to form a single set of rules. As with the rules for predicting whether a potential caller will contact the call system, the rules for predicting a subject matter classification may be translated to a human-readable form so that, for example, a human user may analyze and modify those rules. Similarly, the rules for predicting a subject matter classification may be implemented in a live calling environment by a rules engine. The rules engine may receive events indicative of the current operational state of the service network to predict the subject matter to which the communication (e.g., a call) should be classified.

With reference to FIG. 1, a system 100 may comprise a communication system, such as a call system 102, configured to receive one or more communications (e.g., calls). Such communications may be associated with a service network 106, such as a network providing cable television service, Internet service, or telecommunications service. As an example, one or more communications may be associated with a service error (e.g., interruption). A caller 104, who may be a user of or otherwise associated with the service network 106, may contact the call system 102 to receive support regarding the service network 106. Although the term "call" is referenced throughout the disclosure, it is understood that call may comprise various communication methods such as telephonic communication, messaging, chat sessions, video conference, and the like.

The call system 102 may comprise one or more logical components, including software and/or hardware. For example, the call system 102 may comprise one or more interconnected processors. The call system 102 may comprise a communication interface system, such as a caller interface system 112, which may generally transmit and receive communications with the caller 104. The call system 102 may comprise a rules system 116, which may generate and/or apply one or more sets of rules relating to call prediction and/or service path routing, as will be described in detail herein. Each of the caller interface system 112 and the rules system 116 may be formed of one or more logical components, including hardware and/or software. The call system 102 may comprise a user information database, such as a caller information database 118, which may maintain information relating to the caller 104. The call system 102 may comprise a network information database 120, which may maintain information relating to the current and/or past operational state of the service network 106.

The call system 102 may be communicatively connected to the service network 106. For example, the call system 102 may be connected to the service network 106 via the Internet, an intranet, a wireless communication network (e.g., cellular network), or other type of communication network.

The service network 106 may comprise any type of system or network in which a service or product is provided to its users, which may comprise the caller 104. As some non-limiting examples, the service network 106 may deliver cable television service (e.g., digital cable television service or satellite cable television service), Internet service (e.g., cable Internet service, DSL (digital subscriber line) Internet service, or satellite Internet service) and/or telecommunication service (e.g., cellular telephone service or plain old telephone service (POTS)). The service network 106 may comprise an infrastructure 108. The infrastructure 108 may generally comprise any components, systems, connection media, etc. that are used to effectuate one or more of the services afforded by the service network 106. The service network 106 may comprise one or more articles of customer premises equipment 110 that may be located at a customer's premises (e.g., residence or place of business) and interact with the infrastructure 108. The customer premises equipment 110 may comprise equipment that is possessed or controlled by the customer (as opposed to being part of the infrastructure 108), even if not necessarily maintained at the customer's premises at all times. Such customer premises equipment 110 may comprise a mobile device, such as a cellular telephone, smart phone, tablet computer, or mobile broadband modem. As other examples, the customer premises equipment 110 may comprise network-connected software or hardware components which may operate in an Internet of Things (IoT) environment. Such software or hardware components may comprise a sensor or actuator provided in association with a device (e.g., a consumer electronic device or a home appliance) possessed or controlled by a user of the service network 106.

As some examples, the infrastructure 108 of a service network 106 delivering cable Internet access and/or cable television service may comprise one or more cable modem termination systems (CMTS), cable television headends, distribution nodes or hubs, line amplifiers, and/or a variety of connection mediums (e.g., hybrid fiber-coaxial (HFC) cable, optical fiber cable, coaxial cable, etc.) interconnecting the aforementioned elements. In this example cable Internet service network 106, the customer premises equipment 110 may comprise a cable modem connected, on one end, to the infrastructure 108 and, on the other end, to the customer's local area network, which may comprise a router, personal computer, mobile device, and the like. As another example, the customer premises equipment 110 may comprise a set-top cable box, such as a digital cable converter box or a quadrature amplitude modulation (QAM) client.

As will be discussed in more detail herein, the infrastructure 108 and/or the customer premises equipment 110 may be configured to transmit its respective status, including any errors, to the call system 102. This status information may, accordingly, be used to predict whether—and about what—a communication from the caller 104 will be received by the call system 102.

The caller 104 may be associated with the service network 106. For example, the caller 104 may be a user, such as a customer or subscriber, of the service network 106. The caller 104 may be the party paying for a service provided by the service network 106. As another example, the caller 104 may be a beneficiary of a service provided by the service network 106. For example, the caller 104 may be a resident in a household receiving cable television service and/or Internet service provided by the service network 106. It will be appreciated that the caller 104 may refer to a party that has previously called, is currently calling, or may potentially call in the future the call system 102. Thus, the caller 104, in certain circumstances, may not actually contact the call system 102.

The caller 104 may contact and communicate with the call system 102 via a user device 105. Thus, the user device 105 may comprise a source from which a communication to the call system 102 may be received. The user device 105 may comprise any type of device that may effectuate communication to and/or from the caller 104. For example, the user device 105 may comprise a computing device (e.g., a mobile phone, a tablet computer, or a personal computer), a landline phone, or a voice over IP phone. A source identifier may be associated with the user device 105 and may thereby be associated with any communications effectuated using the user device 105. The source identifier may be associated with the caller 104 and may therefore be used to determine the identity of the caller 104. For example, the source identifier may comprise the telephone number of the user device 105. When the user device 105 is used to contact the call system 102, the user device's 105 telephone number may be accessible to the call system 102 (e.g., via caller ID). The call system 102 may maintain a record of callers and their associated telephone numbers and, thus, may use an identified telephone number to identify a caller.

While the present disclosure generally contemplates that the caller 104 contacts the call system 102 (or vice versa) telephonically (e.g., via a cellular network, a plain old telephone service (POTS), or voice over IP system), the method of contact is not so limited. For example, the caller 104 may contact and communicate with the call system 102 via text message or Internet chat (e.g., a chat interface on a website associated with the service network 106). Accordingly, unless otherwise indicated, reference to "calling," "calls," or the like is to be understood to encompass any means of communication between the caller 104 and the call system 102. Likewise, use of the terms "caller," "caller interface system," caller information database," "call information," caller information," "caller behavior model," and the like are not limited in their respective aspects to telephonic communications but may be understood to relate to any means of communication.

The caller 104 may attempt to contact the call system 102 for a variety of reasons relating to the service network 106. For example, the caller 104 may contact the call system 102 to inquire about a bill or to modify the services provided to the caller 104 by the service network 106 (e.g., add a premium cable channel package to their account). As another example, the caller 104 may contact the call system 102 to report a problem with the service network 106, such as if the caller's 104 cable television reception is not clear or the caller's 104 Internet access is not functioning properly. As yet another example, the caller 104 may contact the call system 102 to check on the status of a previously reported problem with the service network 106. Conversely, the call system 102 may proactively contact the caller 104 for the aforementioned reasons regarding the service network 106, such as upon a determination that one or more of the aforementioned conditions has occurred (e.g., the caller's 104 Internet access is not available) and that the caller 104 is likely to contact the call system 102 regarding this condition.

The call system 102, in particular the caller interface system 112, may receive the communication from the user device 105 associated with the caller 104 and classify the communication according to one or more service paths 114*a-c*. Each of the service paths 114*a-c* may correspond to one or more subject matters of potential communications. For example, the service path 114*a* may correspond to communications relating to billing matters, the service path 114*b* may correspond to communications relating to problems with cable television delivery, and the service path 114*c* may correspond to communications relating to cloud digital video recorder (DVR) service. The service paths 114*a-c* are not limited to particular services of the service network 106, but may additionally or alternatively be differentiated based on other factors, such as geography, logical location within the service network 106, and/or the type of problem experienced with a service of the service network.

In turn, the communication may be routed to a customer service agent that is prepared (e.g., sufficiently trained and with the proper authority) to handle a communication corresponding to the service path 114*a-c* to which the communication was classified. As an alternative to or in addition to routing the communication to a human customer service agent, the communication may be routed to an automated customer service module that is configured to handle communications corresponding to that particular service path 114*a-c*. For example, if it is determined that a communication is classified in a service path 114*a-c* for Internet connectivity inquiries, the call may be routed to an automated service module that communicates a status of an ongoing Internet outage. The automated service module may, for example, communicate an estimated time at which the Internet outage is expected to be fixed.

The classification of communications to the call system 102 may be performed by the caller interface system 112 according to one or more rules determined by the rules system 116. The rules system 116 may maintain a set of rules determined according to various machine learning techniques and/or human input-based curation, as will be described in greater detail herein. The rules of the rules system 116 may be determined according to status information pertaining to the service network 106 and/or information pertaining to the caller 104, including a caller behavior profile.

The call system 102, and the rules system 116 in particular, may receive status information from the service network 106 and store this status information in the network information database 120 of the call system 102. The status information may comprise information pertaining to the operational state of the service network 106, including the state and/or operation of the infrastructure 108 and/or the customer premises equipment 110. For example, a set top cable box may generate and transmit status information to the call system 102 describing the set top cable box's operation. For example, this information may comprise an identification of a channel being viewed and/or connection parameters describing the set top cable box's network location within the service network 106, etc. This information from the set top cable box may comprise error or diagnostic data (e.g., an indication that the set top cable box is not receiving some expected video content packets). As another example, the status information may indicate the operational state of a cellular network base station, including error and/or diagnostic data from the base station.

As another example, the infrastructure 108 of the service network 106 may report status information to the call system 102 that a network outage has occurred in a subset (e.g., a particular geographic location) of the service network 106. The status information received from the service network 106 and/or previously-received status information retrieved from the network information database 120 may be leveraged to determine a probability as to whether a potential communication will be received by the call system 102. The status information may additionally or alternatively be used to generate and maintain the set of rules by which a communication, or potential communication, may be classified and routed within the call system 102.

The rules determined and maintained by the rules system 116 may additionally or alternatively be based on information received and/or accessed from the caller information database 118 of the call system 102, to which the rules system 116 is communicatively connected. The caller information database 118 may store profiles of the users (e.g., the caller 104) of the service network 106. Each profile may comprise a caller's 104 name or other unique identifier, a geographic location or address, a logical location within the service network 106 (e.g., an IP (internet protocol) address), an identifier of an associated user device 105, and/or an identifier of an associated customer premises equipment 110 (e.g., a MAC (media access control) address). The profiles stored in the caller information database 118 may additionally or alternatively comprise account information describing the services provided by the service network 106 to that user, such as the cable television plan associated with the account, which cable television channels are provided by the service network 106, and/or the Internet speed generally expected to be provided to the customer. Other example account information stored in the caller information database 118 may comprise a service usage allocation for that account, including an allocation of cellular service minutes, text messages, and/or data usage.

The caller information database 118 may additionally or alternatively comprise historical communication information, such as historical calling information, of the users (e.g., the caller 104) of the service network 106. In particular, the historical calling information may comprise a behavior profile of a caller 104 indicative of characteristics of the caller 104 regarding the caller's 104 likelihood of contacting the call system 102. The behavior profile may reflect whether the caller 104 contacts the call system 102 at all and/or the timeframe in which the caller 104 contacts the call system 102. For example, the behavior profile may indicate that the caller 104 is quick (e.g., within 30 minutes) to contact the call system 102 if the caller experiences a problem with the service network 106. Conversely, the behavior profile may indicate that the caller 104 waits a significant period of time (e.g., greater than 6 hours) before contacting the call system 102, even though the caller 104 usually eventually does contact the call system 102. The likelihood of the caller 104 contacting the call system 102 may be with respect to a general predilection or tendency for the caller 104 to contact the call system 102, without regard to the subject matter or reason for the communication. Additionally or alternatively, the likelihood of the caller 104 calling the call system 102 may be categorized according to the subject matter or reason for the communication. For example, the behavior profile associated with the caller 104 may indicate that the caller 104 is quick to contact the call system 102 for issues with the caller's 104 Internet access, but rarely contacts the call system 102 if there is a problem with the caller's cable television service. As another example, the behavior profile associated with the aforementioned example caller 104 may indicate that the caller 104 usually only contacts the call system 102 for full outages of the caller's Internet access but seldom contacts the call system 102 for degradations in Internet bandwidth.

Figure 2:
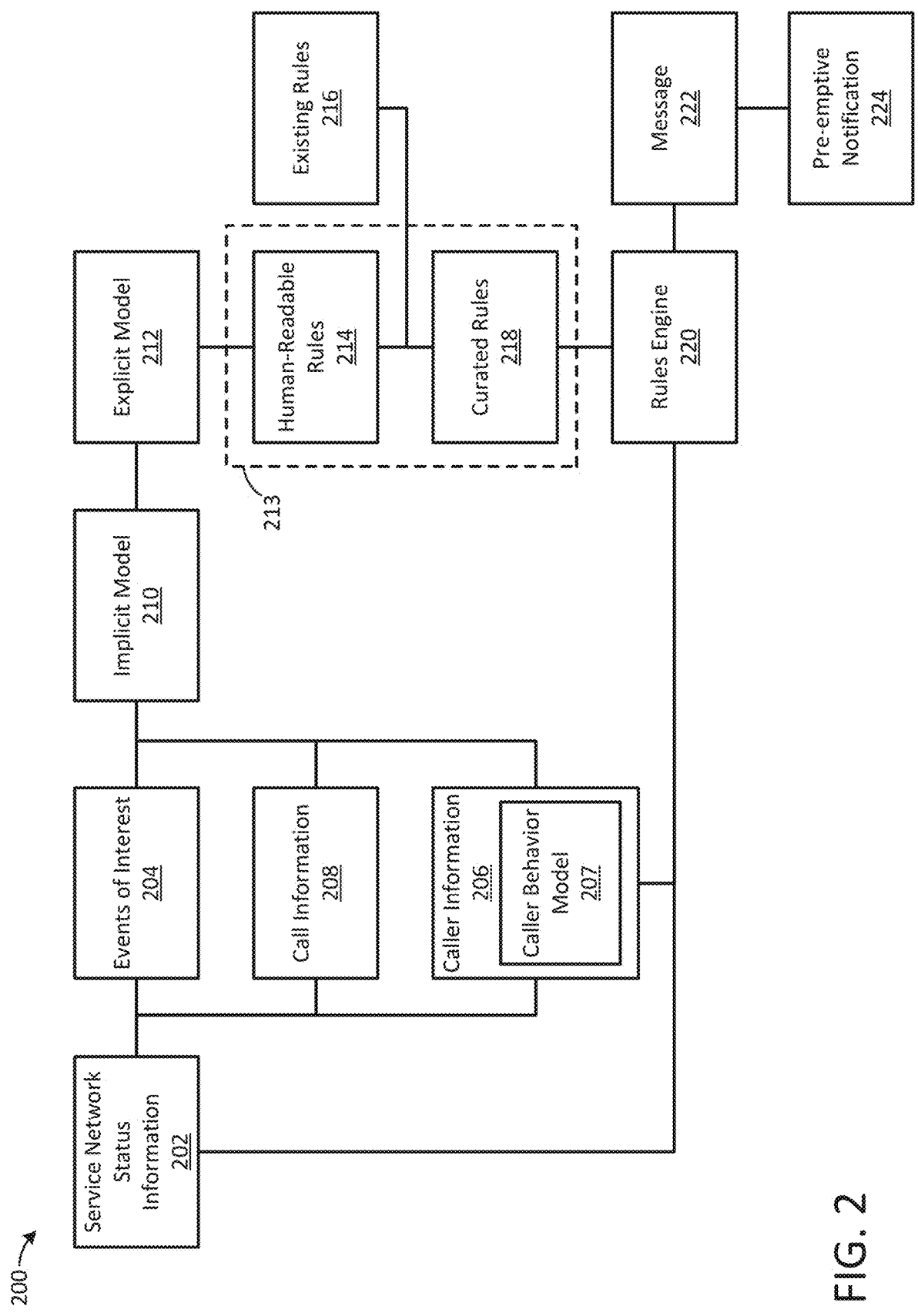
FIG. 2 shows a flow diagram of example operational data structures.

With continued reference to FIG. 1, FIG. 2 shows a flow diagram 200 describing various operations relating to generating a set of rules that may be used to predict whether a communication (e.g., a call) from a user device (e.g., the user device 105) associated with a caller (e.g., the caller 104) is likely to be received by a call system (e.g., the call system 102). The set of rules may be used to pre-emptively effectuate a communication to the caller before the caller contacts the call system.

Service network status information 202 may be received from a service network (e.g., the service network 106) and analyzed to determine one or more events of interest 204 with respect to the service network that may potentially cause a communication to be received by the call system. A communication behavior model, such as a caller behavior model 207, may be accessed or received that generally represents the caller's propensity to contact the call system. Communication information, such as call information 208, indicative of communications received by the call system may also be accessed or received. Leveraging the events of interest 204, the call information 208, and/or the caller behavior profile 207 as training set data, an implicit model 210 may be generated using machine learning and/or data mining techniques. The implicit model 210 may represent the likelihood of whether a communication will be received by the call system under a variety of circumstances. The implicit model 210 may be extracted to an explicit model 212, which, in turn, may be translated into a set of rules 213. The rules 213 may comprise human-readable rules 214. The human-readable rules 214, along with existing rules 216, may be reviewed and/or modified by human users to generate a set of curated rules 218. The rules 213 may be applied in a rules engine 220 that may analyze the real-time state of the service network to determine if the communication is likely to be received by the call system.

The events of interest 204 may represent one or more occurrences of an event or condition in the service network that may potentially cause the caller, via the associated user device, to contact the call system. Typically, the events of interest 204 may represent abnormal or undesirable conditions within the service network, particularly from the perspective of the caller. For example, the events of interest 204 may reflect that the Internet access provided to the caller by the service network was unavailable for a certain period of time or only afforded a reduced bandwidth for that period of time. As other examples, the events of interest 204 may reflect that the cable television service of the service network was interrupted for a period of time or that the caller experienced poor picture quality with the service network's cable television service. As already indicated by the aforementioned examples, the events of interest 204 may reflect not only that an event or condition occurred but also an indication of a corresponding date and/or time (e.g., a timestamp) or a range of dates and/or times.

The events of interest 204 may additionally or alternatively reflect various conditions or occurrences not directly related to the service network but which may nonetheless affect the performance of the service network and/or the caller's enjoyment of the service network. For example, the events of interest 204 may reflect a weather condition, a traffic condition, the time of year, or season.

The events of interest 204 may be determined, such as by the rules system 116, based at least in part on the service network status information 202. The service network status information 202 may comprise status information received or accessed from the service network and/or received or accessed from the network information database 120. In particular, the service network status information 202 may comprise status information describing aspects of the operational state of the service network. As used herein, the operational state of the service network may generally comprise any indication of the state of the service network, including that of the infrastructure (e.g., the infrastructure 108) and/or customer premises equipment (e.g., the customer premises equipment 110) thereof. The operational state of the service network may encompass normal and/or abnormal operational states. As an example, the service network status information 202 may comprise an indication of the operational state of an article of customer premises equipment, such as the television channel being viewed on a set top cable box. As another example, the service network status information 202 may comprise information reflecting any error or diagnostic messages (or lack thereof) transmitted by a component of the service network and with respect to a particular operational aspect or parameter of that component.

The call information 208 may generally comprise information describing various characteristics of past communications to the call system. In particular, the call information 208 may comprise a timestamp of a communication and the subject matter or reason for the communication (e.g., to which service path (e.g., the service paths 114$a$-$c$) the communication was classified). For example, if an interactive voice response (IVR) system was used to ascertain the reason for a communication, the caller's given responses to the IVR prompts, as well as a resultant service path classification, may be included in the call information 208. Additionally or alternatively, if a human user associated with the call system is involved in classifying or otherwise analyzing the subject matter of a communication, that human user's classification or other characterization or tagging of the communication may be indicated in the call information 208. For example, a human user associated with the call system may initially speak with the caller and classify the communication into one of the service paths. As another example, a human user associated with the call system may listen to or read a voice message or text message, respectively, by the caller describing the reason for the communication. The human user may classify the communication associated with the voice or text message accordingly. The call information 208, including the timestamp of the communication and data indicative of the subject matter or reason for the communication, may be leveraged by various machine learning and/or data mining processes to determine the implicit model 210.

User information, such as caller information 206, may generally refer to information describing the caller, such as that stored in the caller information database 118. The caller information 206 may comprise, for example, an identification of the caller, a geographic location or address, a logical location within the service network, an identifier of an associated customer premises equipment, and/or an identifier of an associated user device. The caller information 206 may additionally or alternatively comprise information about the caller's account with the service network, such as which channels are included in the caller's cable television service plan or the Internet speed of the caller's Internet service.

The caller information 206 may comprise a user behavior model, such as a caller behavior model 207, which may generally be indicative of the caller's propensity to contact the call system, particularly when the caller experiences a problem with the service network. The caller behavior model 207 may be based on the caller's historical usage of the call system, collected over a period of time and stored in the caller information database 118, as discussed above. The caller behavior model 207 may indicate a general likelihood that the caller contacts the call system, regardless of the nature of the problem that the caller experiences with the service network. Additionally or alternatively, the caller behavior model 207 may indicate that the caller contacts the call system for a particular problem or subset of problems that the caller encounters with the service network. For example, the caller behavior model 207 may reflect that the caller is very likely to contact the call system for Internet access problems, but rarely calls for problems with a cable television service. The caller behavior model 207 may indicate that the caller belongs to one of several categories or profiles of callers, with each category or profile reflecting a likelihood of contacting the call system. For example, the caller behavior model 207 may reflect that the caller belongs to one of five categories of caller: (1) never calls; (2) rarely calls; (3) calls at an average frequency; (4) calls the majority of times; and (5) always calls. The caller behavior model 207 may reflect not only whether the caller contacts the call system, but, additionally or alternatively, how long the caller waits before contacting the call system (e.g., an average time). Thus, a behavior profile of the caller may be expressed as a two-dimensional variable, with one dimension reflecting whether the caller will contact the call system at all and a second dimension reflecting how long the caller waits before contacting the call system.

The events of interest 204, the call information 208, and/or the caller information 206 (e.g., the caller behavior model 207) may be used to determine the implicit model 210 representing the likelihood of whether the a call will be received from the user device associated with the caller under various conditions. The implicit model 210 may be determined according to one or more machine learning and/or data mining techniques, including supervised learning. In particular, tree-based methods, such as decision trees and gradient-boosted decision trees, may be employed. The events of interest 204 reflecting the operational state of the service network (or other factors) may be joined with the call information 208 indicative of one or more historical communications, thereby potentially correlating the events of interest 204 with received communications. In particular, data for each of the events of interest 204 may be tagged with data indicating whether the event of interest precipitated a received communication or not. The events of interest 204 causing a received communication, the events of interest 204 not causing a received communication, and the caller information 206 (the caller behavior model 207, in particular) may be used as training set inputs to a machine learning algorithm, such as a decision tree machine learning algorithm, to determine the implicit model 210. In an example employing a decision tree machine learning algorithm, the implicit model 210 may accordingly be in the form of a decision tree discriminating between the events of interest 204 and the predilection of the caller to contact the call system reflected in the caller behavior model 207.

The implicit model 210 may be translated into the explicit model 212. For example, if the implicit model 210 was determined using a decision tree machine learning algorithm, the explicit model 212 may be in the form of a human-readable decision tree. The explicit model 212, in turn, may be expressed as the rules 213, which may include the human-readable rules 214. The human-readable rules 214 may be in a form that may be understood and potentially modified by an appropriately skilled human user. For example, the human-readable rules 214 may comprise one or more regular expressions in the form of: IF [condition(s)] THEN [result]. The [condition(s)] may comprise one or more conditions relating to the service network and/or the events of interest 204 and one or more conditions relating to the caller's calling profile (e.g., the caller behavior model 207). The [result] may be an indication of whether a communication from the user device associated with the caller is expected to be received. As one example, the regular expression may comprise: IF (event of interest parameter #1>=50 at 11:00 AM any day of the week) AND (event of interest parameter #2>=10 between 8:00 AM and 5:00 PM any weekday) AND (the caller calls at an average frequency) THEN (the caller will call). In this regard, generating the explicit model 212 as a decision tree is particularly advantageous since a decision tree is readily expressed in the aforementioned form of regular expression.

Expressing the explicit model 212 as the human-readable rules 214 provides several advantages. For example, the human-readable rules 214 being explicit or human-readable may facilitate merging the human-readable rules 214 with existing rules 216 that were created through other means. The existing rules 216 may comprise home automation rules or caller preference rules, for example. Another advantage in expressing the explicit model 212 as the human-readable rules 214 may be that the human-readable rules 214 (as well as the merged existing rules 216, which may also be in human-readable form) may be analyzed and/or modified by a human user associated with the call system. For example, the human user may review the human-readable rules 214 for compliance with quality and production deployment procedures. The human user may review the human-readable rules 214 according to the human user's professional judgement and expertise. Accordingly, based at least on the human user's review and/or modification of the human-readable rules 214, a set of curated rules 218 may be generated. While the above description contemplates a context in which the human-readable rules 214 are reviewed and/or modified to generate the curated rules 218 following the human-readable rules 214 being generated from the explicit model 212, the disclosure is not so limited; the human-readable rules 214 and/or the curated rules may be reviewed and/or modified at any time, such as if the human user later determines that the currently deployed curated rules 218 could be improved.

The rules 213, including the human-readable rules 214 and/or the curated rules 218, may be deployed in a rules engine 220 to predict if a communication from the user device associated with the caller is likely to be received. In particular, the rules engine 220 may receive or access real-time and/or recent service network status information 202 reflecting the current operational state of the service network, including that of the infrastructure and the customer premises equipment. The rules engine 220 may additionally or alternatively receive or access the caller information 206, the caller behavior model 207 in particular. The rules engine 220 may apply one or more of the rules 213 to the service network status information 202 and the caller behavior model 207 to predict whether the a communication from the user device associated with the caller will be received by the call system, particularly with respect to the current and/or recent operational state of the service network. The service network status information 202 may be analyzed, in the manner described above, to identity one or more current and/or recent events of interest 204 and those events of interest 204 may be accessed or received, instead of or in addition to the service network status information 202, by the rules engine 220. The rules engine 220 may thus apply one or more of the rules 213, including one or more of the human-readable rules 214 and/or curated rules 218, to the events of interest 204, along with the caller behavior model 207, to predict whether a communication from the user device associated with the caller is likely to be received.

If the rules engine 220 determines, using the rules 213, that the communication is likely to be received by the call system, a message 222 indicating so may be generated. The message 222 may be delivered to the caller interface system 112 and may be used in classifying a communication or potential communication from the caller. The message 222 indicating that the caller is likely to contact the call system may trigger a pre-emptive notification 224 to the caller. For example, the pre-emptive notification 224 may be transmitted to the user device associated with the caller. Generally, the pre-emptive notification 224 may be intended to inform the caller that the service network provider is aware of the operational state of the service network (e.g., a problem with or abnormal condition of the service network). The pre-emptive notification 224 may communicate, for example, an estimated time for the problem to be resolved and/or instructions for the caller to circumvent the problem with the service network. Due to the pre-emptive notification 224 communicated to the caller, the caller may be less inclined to contact the call system for that same problem, thereby eliminating the associated cost to the call system and/or service network provider. The pre-emptive notification 224 may be initiated by the caller interface system 112, for example, and may be in the form of an automated voice message telephone call, a text message (e.g., an SMS (short message service) text message), an email, or other form of communication. The pre-emptive notification 224 may be embodied in an on-screen television notification displayed to the caller. For example, the pre-emptive notification 224 may be transmitted to the caller's set-top cable box which causes the pre-emptive notification 224 to be overlaid on a television program. Additionally or alternatively, an agent of the call system may effectuate the pre-emptive notification 224 by pre-emptively contacting the caller before the caller has a chance to contact the call system.

It will be appreciated that the rules engine 220 may implement the implicit model 210 and/or the explicit model 212 in the manner described above. The implementation of the implicit model 210 and/or the explicit model 212 by the rules engine 220 may be in addition or alternative to the implementation of the curated rules 218. Thus the rules implemented by the rules engine 220 do not necessarily have to be human-readable.

Figure 3:
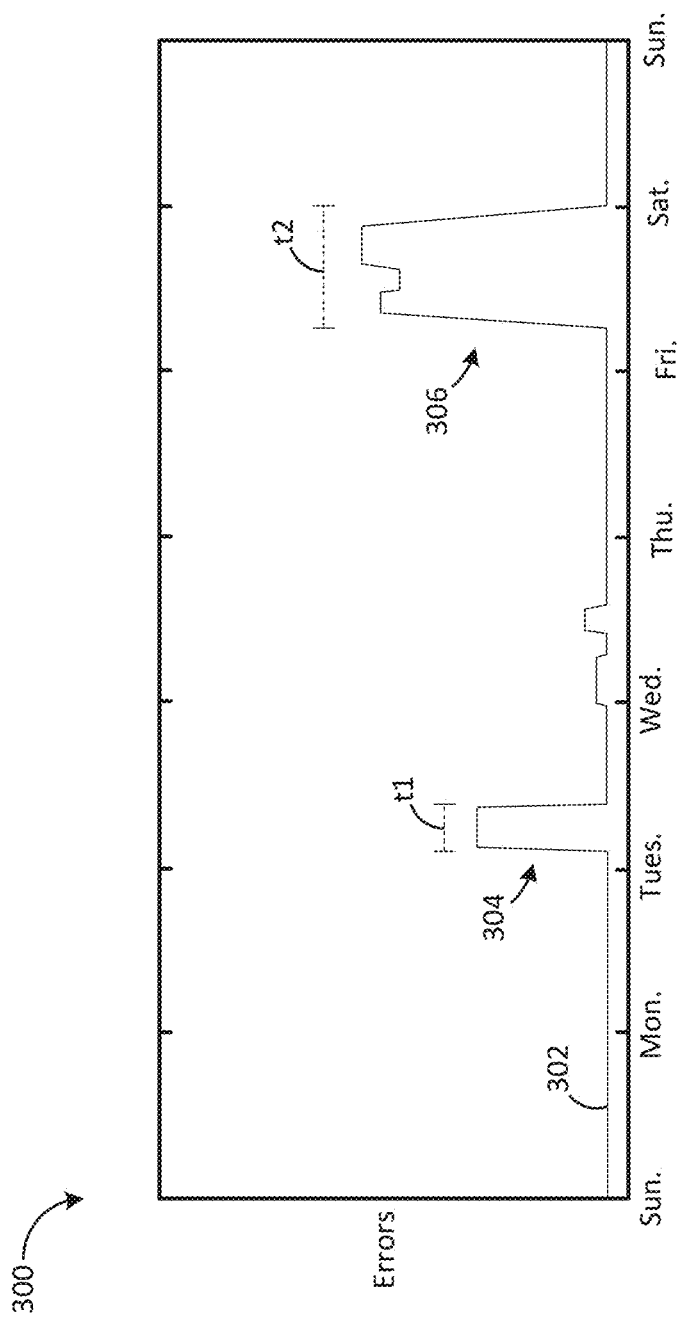
FIG. 3 shows a graph of an example signature of error or diagnostic data.

With reference to FIG. 3, as well as continued reference to FIGS. 1 and 2, an example of a process of identifying the events of interest 204 and use thereof shall now be described. As described above, the events of interest 204 may be determined based on the service network status information 202 reflecting an operational state of at least a portion of the service network (e.g., the service network 106) and the call information 208 describing past communications (e.g., calls) made to the call system (e.g., the call system 102). FIG. 3 shows a graph 300 of a signature of error messages or diagnostic data representing an operational state of at least a portion of the service network. The graph 300 comprises a Y-axis representing the number of errors received for a particular operating parameter of a component of the service network. The X-axis of the graph 300 represents a sample period of time, namely a seven-day week, over which the aforementioned errors, if any, may be received.

A feature detection algorithm (or other method) may be leveraged to identify any events of interest (e.g., the events of interest 204) reflected in the signature 302 shown in the graph 300 and representing the number of errors for that particular parameter. In the graph 300, the feature detection algorithm may identify a first event of interest 304, which occurred at a time t1 (roughly corresponding to Tuesday morning), and a second event of interest 306, which occurred at a time t2 (roughly corresponding to the latter majority of Friday). While the graph 300 includes only a single parameter signature for purposes of illustration, it is contemplated that a plurality of parameter signatures may be received and analyzed to identify respective events of interest.

The events of interest 304, 306 may each potentially negatively affect the caller's experience within the service network and thus may potentially motivate a caller (e.g., the caller 104) to contact the call system. For example, the events of interest 304, 306 may each reflect a condition that may potentially impact the caller's ability to place and receive calls in a cellular network provided by the service network. To determine which events of interest caused (or are otherwise temporally associated with) a communication (e.g., a call) to the call system, the first event of interest 304 and the second event of interest 306 may each be correlated or joined with the call information 208 indicative of the caller's past communications to the call system.

For example, the call information 208 may reflect that the caller did not contact the call system during (or otherwise temporally associated with) the time t1, during which the first event of interest 304 occurred. Thus, the data indicative of the first event of interest 304 may be tagged to reflect that the first event of interest 304 did not cause the caller to contact the call system. Yet, the call information 208 may indicate that the caller did contact the call system to report a problem related to the second event of interest 306 and during (or otherwise temporally associated with) the time t2. Thus, the data indicative of the second event of interest 306 may be tagged to reflect that the second event of interest 306 caused the caller to contact the call system. The data indicative of the first event of interest 304 tagged to reflect that the first event of interest 304 did not cause a communication and the data indicative of the second event of interest 306 tagged to reflect that the second event of interest 306 did cause a communication, as well as the caller behavior model 207, may be provided as dimensional inputs (e.g., a training data set) to a machine learning algorithm, such as a decision tree machine learning algorithm, to determine the implicit model 210.

Figure 4:
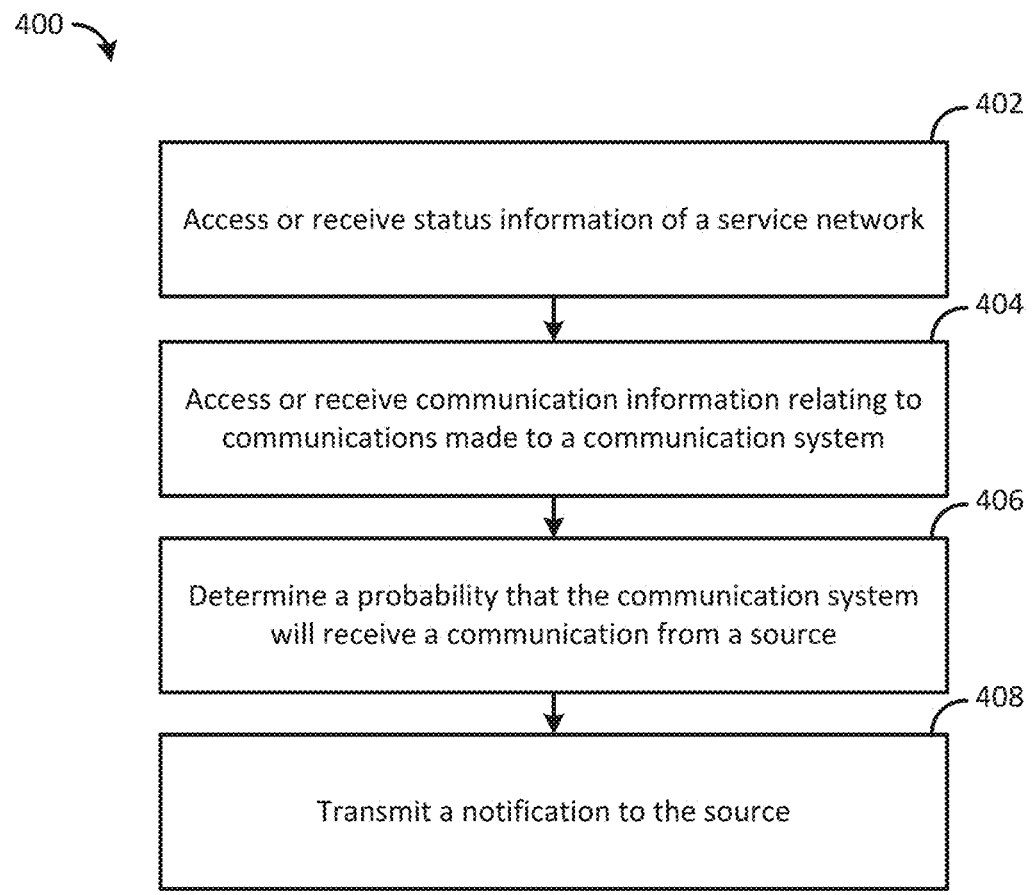
FIG. 4 shows an example method.

FIG. 4 shows, with additional reference to FIGS. 1-2, an example method 400 of determining a probability that a communication (e.g., a call) will be received by a communication system, such as a call system (e.g., the call system 102). The communication may be received from a source (e.g., the user device 105) associated with a potential caller (e.g., the caller 104). A notification may be transmitted to that source if the probability satisfies (e.g., exceeds) a pre-determined threshold.

At step 402, status information (e.g., the service network status information 202) may be accessed or received. The status information may indicate the operational state of the service network. The operational state of the service network indicated by the status information may be for a first time period. For example, the first time period may be a time period previous to a second time period during which a current potential communication may be received by the call system (such as the communication referenced in step 406 below). As examples, the status information may indicate the technical state and/or operation of the various components of the service network, such as the infrastructure (e.g., the infrastructure 108) and/or customer premises equipment (e.g., the customer premises equipment 110). The status information may comprise error data indicative of an interruption of an operation of the service network.

At step 404, communication information, such as call information (e.g., the call information 208), may be accessed or received. The call information may indicate one or more communications received by the call system. The call information may comprise respective indications of when the communication was received (e.g., a time stamp), the identity of the caller and/or associated user device that performed the communication, and/or the subject matter of the communication. For example, the subject matter of the communication may be discerned according to which service paths (e.g., the service paths 114a-c) the communication was classified. As some examples, subject matter of the communication may be derived from interaction with an IVR system and/or interaction with a human user associated with the call system (e.g., a call center operator). The human user may, for example, tag the communication in the call information with various characteristics of the communication, including the subject matter or reason for the communication.

The communications indicated by the call information may be communications that were received during a time period prior to a time period during which a current potential communication is received by the call system. This time period of the communication indicated in the call information may partially or fully coincide with the first time period reflected in the status information received or accessed in step 402. As such, this time period of the communication indicated in the call information may be the first time period.

At step 406, a probability may be determined based at least in part on the status information from step 402 and the call information from step 404. The probability may reflect a likelihood that the call system will receive a potential communication. The potential communication may be from a particular user device associated with a potential caller. The probability may be with respect to a second period of time. That is, the probability may indicate a likelihood that the call system will receive the communication during the second time period. The second time period may be after the aforementioned first time period associated with the status information and/or the call information.

The determination of the probability may be based at least in part on user information, such as caller information (e.g., the caller information 206, including the caller behavior model 207) indicating a usage of the call system by the user device and/or the caller associated with the user device. For example, the caller information may reflect a general propensity for the caller to contact the call system. This may comprise an indication of whether the caller typically contacts the call system, an average time before the caller contacts the call system, and/or a frequency at which the caller contacts the call system.

At step 408, a notification (e.g., the pre-emptive notification 224) may be transmitted to the source (e.g., the user device) associated with the caller. The transmission of the notification may be based on a determination that the probability determined in step 406 satisfies (e.g., exceeds) a pre-determined threshold. For example, if the pre-determined threshold is a 75% probability that the call system will receive the communication and the determined probability is an 80% probability that the call system will receive the communication, the notification may accordingly be transmitted. The notification may indicate a current operational state of the service network. For example, the notification may indicate an operational state of the service network during the second time period associated with the probability. The notification may serve to inform the potential caller of the current operational state of the service network and thereby preempt the caller from contacting the call system. For example, the notification may indicate that the caller's Internet service is down and that the service network is aware of the outage and estimates restoration of service in one hour. With this information, the caller may refrain from contacting the call system, thereby reducing communication traffic to the call system.

Figure 5:
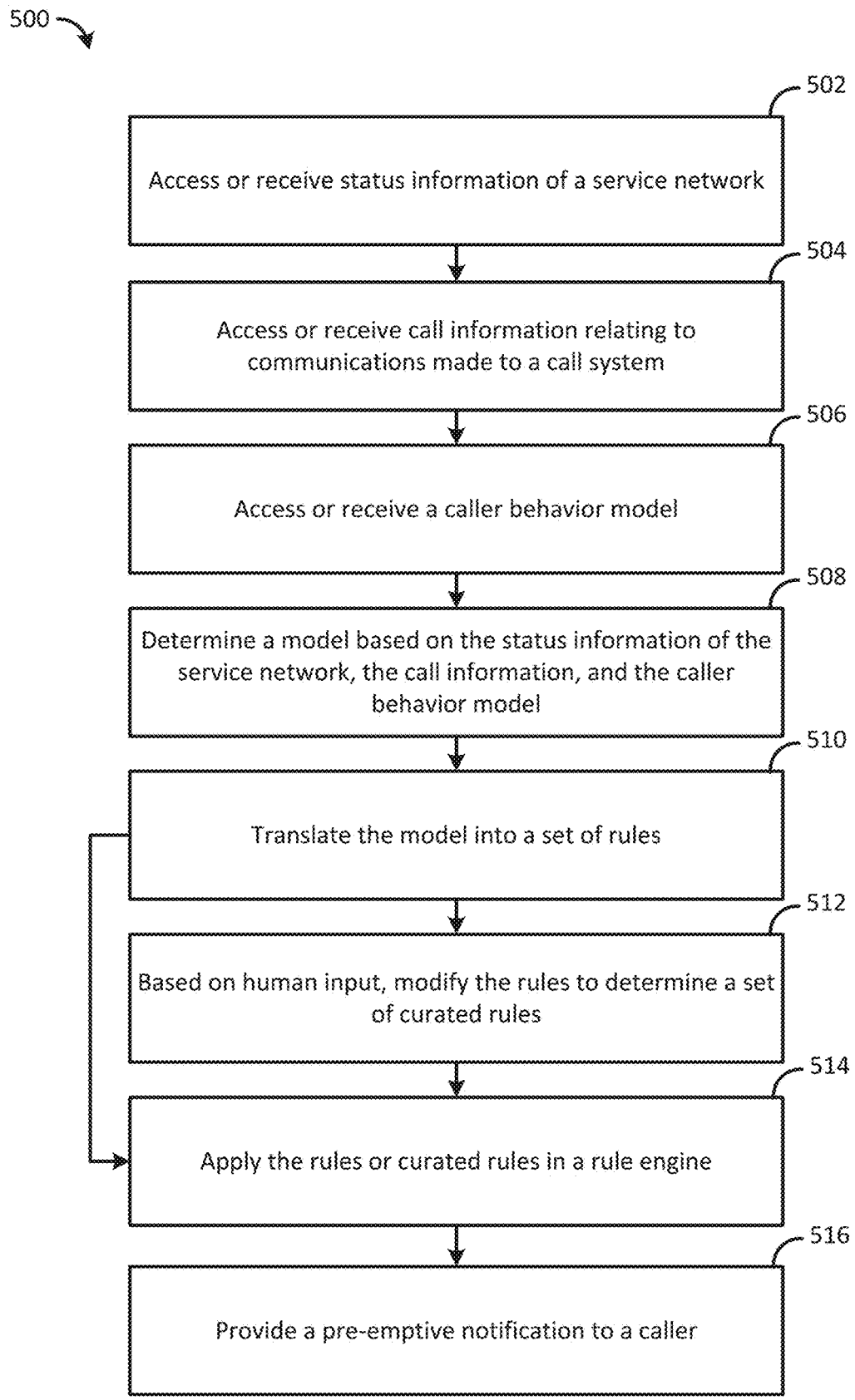
FIG. 5 shows an example method.

FIG. 5 shows, with additional reference to FIGS. 1-2, an example method 500 of generating a set of rules usable to predict whether a communication (e.g., a call) from a user device (e.g., the user device 105) associated with a caller (e.g., the caller 104) is likely to be received. The prediction may be based on a current operational state of a service network (e.g., the service network 106) and the caller's behavior profile describing their general calling habits or tendencies. At step 502, status information of the service network, (e.g., the service network status information 202) may be received or accessed. The status information may indicate the operational state of the service network during a particular time period. For example the status information may indicate the operational state of the service network during a time period previous to the time period during which a current potential communication may be received by the call system (such as that referenced in step 514 below). The call system, and the rules system 116 in particular, may receive status information describing the operational state of the service network. The status information describing the operational state of the service network may comprise the technical state and/or operation of various components of the infrastructure (e.g., the infrastructure 108) and customer premises equipment (e.g., the customer premises equipment 110). The status information of the service network may be stored in the network information database 120 and later accessed by the rules system 116. The status information of the service network may comprise, for example, signatures of error messages and/or diagnostic data.

Events of interest (e.g., the events of interest 204) may be determined from the status information received from the service network. The events of interest may represent, for example, abnormal or problematic conditions within the service network that may cause an interruption in an operation of service network. For example, the events of interest may reflect the Internet service provided by the service network being unavailable or the cable television service provided by the service network not providing a clear picture quality. The events of interest may be identified in the status information from the service network using a feature detection algorithm, for example.

At step 504, call information (e.g., the call information 208) relating to past communications made to the call system may be accessed or received. The call information may be accessed or received, for example, by the rules system 116 of the call system. As described above, the call information may comprise an indication that each of the communications occurred, a time stamp of each of the communications, and information indicating the subject matter or reason for each of the communications (e.g., to which service paths (e.g., the service paths 114a-c) the communication was classified). For example, the call information may indicate one or more communications received by the call system during a time period prior to a time period during which a current potential communication may be received by the call system (as referenced in step 514 below). This time period associated with the call information may partially or fully coincide with the time period reflected in the status information received or accessed in step 502. The call information may derive from interaction with an IVR system and/or interaction with a human user associated with the call system (e.g., a call center operator). The human user may, for example, tag the communication in the call information with various characteristics of the communication, including the subject matter or reason for the communication.

At step 506, a caller behavior model (e.g., the caller behavior model 207) may be accessed or received, such as by the rules system 116 of the call system. The caller behavior model may indicate a caller's general tendency or predilection to contact the call system 102. The caller behavior model may describe a caller's call behavior without regard to the subject matter of the communication, with regard to the subject matter of the communication, or both. The caller behavior model may classify a caller into one of several profiles or categories, each reflecting the caller's behavior relating to whether the caller will contact the call system and/or how long the caller is anticipated to wait before contacting the call system.

At step 508, a model (e.g., the implicit model 210) may be determined. The model may be based at least in part on the status information of the service network, the call information relating to past communications made to the call system, and the caller behavior model. In particular, the implicit model may be determined using various machine learning and/or data mining techniques, such as decision tree learning or other supervised machine learning algorithm. If the events of interest were identified in the status information of the service network, the implicit model may be based also on the events of interest, either in addition to or as an alternative to the status information of the service network. The events of interest may be joined with the call information to identify, and thereby tag, whether each of the events of interest caused a communication to the call system by a respective caller. Accordingly, the status information of the service network, the call information relating to communications made to the call system, and the caller behavior model may be used as a training set of data for input to the machine learning algorithm used to determine the implicit model. The implicit model may be translated into an explicit model (e.g., the explicit model 212). For example, if the implicit model was determined using a decision tree machine learning algorithm, the explicit model may comprise a human-readable decision tree.

At step 510, the model of step 508 (e.g., the implicit model or the explicit model, as applicable) may be translated into human-readable rules (e.g., the human-readable rules 214). For example, the human-readable rules may comprise one or more regular expressions in the form of IF [condition(s)] THEN [result] expressions, wherein the [condition(s)] comprises one or more conditions relating to the service network and/or the events of interest and one or more conditions relating to a caller's calling profile (e.g., the caller behavior model 207) and the [result] is an indication of whether a communication from the caller is expected to be received by the call system.

At step 512, based on human input, the human-readable rules of step 510 may be modified to determine a set of curated rules (e.g., the curated rules 218). For example, a human user associated with the call system may review and analyze the human-readable rules and modify the human-readable rules accordingly to determine the curated rules. The curated rules may comprise existing rules (e.g., the existing rules 216) that are merged with the human-readable rules. The existing rules may pertain to criteria other than the operational state of the service network or the behavior profile of a caller, such as home automation criteria or caller preference criteria. The existing rules may comprise rules relating to weather, traffic, the time of year, and/or the season, as some other examples.

At step 514, the curated rules of step 512 may be applied by a rules engine (e.g., the rules engine 220) to predict whether a communication from the user device associated with the caller is likely to be received by the call system. Thus, based at least in part on the status information received or accessed in step 502 and the call information received or access in step 504, a probability that the call system will receive, during a current time period, a communication from the user device associated with the caller may be determined. This current time period may be a later time period than those associated with the received status information and call information.

The application of the curated rules to determine a probability that the caller will contact the call system may be based on the current operational state of the service network and/or the behavior profile of the potential caller (e.g., the caller behavior model 207). Accordingly, step 514 may comprise the sub-steps of the call system receiving status information from the service network (e.g., the service network status information 202) reflecting the current operational state of at least a portion of the service network and receiving the behavior profile (e.g., the caller behavior model 207) of a potential caller. The current status information of the service network and the behavior profile may thus be used as inputs to one or more of the curated rules used by the rules engine to determine if the communication from the potential caller is likely to be received by the call system.

At step 516, responsive to the rules engine determining that a communication from the potential caller is likely to be received by the call system, a pre-emptive notification (e.g., the pre-emptive notification 224) may be generated and communicated to the caller, via the associated user device, before the caller contacts the call system. For example, if the probability that the call system will receive a communication from the user device of the potential caller satisfies a pre-determined threshold, a pre-emptive notification may be transmitted to the user device associated with the potential caller. The pre-emptive notification may indicate a current operational state of the service network (e.g., the operational state of the service network during the time period for which the aforementioned probability was determined). The pre-emptive notification may be in the form of an email or a text message, as some examples. Additionally or alternatively, the pre-emptive notification may be communicated by a human user associated with the call system calling or otherwise contacting the caller.

In addition or alternative to transmitting the pre-emptive notification to the user device of the aforementioned potential caller, the pre-emptive notification may be transmitted to other potential callers (and/or respective associated user devices) as well. The other potential callers to which the pre-emptive notification may be transmitted may include those other potential callers with some characteristic in common with the instant potential caller. As examples, the common characteristic may relate to services received from the service network (e.g., both have the same cable package), a caller behavior profile (e.g., both are likely to call in the event of a service interruption), or the infrastructure (e.g., both may be connected to or part of a common infrastructure element, such as a common Internet hub). Thus, when it is determined to transmit the pre-emptive notification to the instant potential caller, it may be beneficial to also transmit the same or similar pre-emptive notification to other potential callers that may be experiencing the same or similar service interruptions as the instant potential caller.

Figure 6:
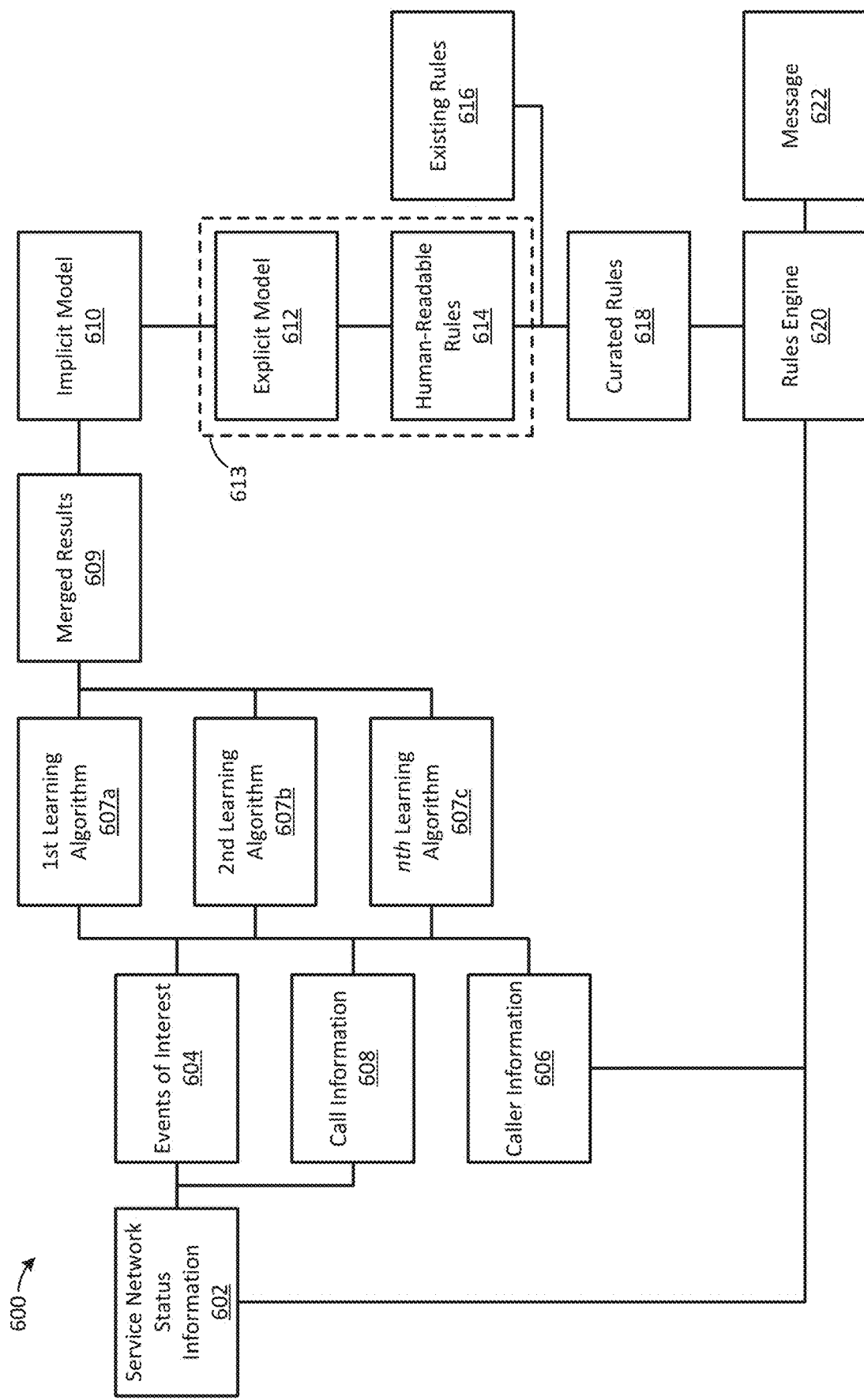
FIG. 6 shows a flow diagram of example operational data structures.

FIG. 6 shows, with additional reference to FIGS. 1-2, a flow diagram 600 describing various operations relating to determining a set of rules by which a communication (e.g., a call) may be classified or sorted into a service path (e.g., one of the service paths 114a-c). It will be appreciated that the operations described in relation to the flow diagram 600 may be used in conjunction with those operations described in relation to the flow diagram 200 shown in FIG. 2.

By way of introduction, a learning algorithm 607a-c may be generated for each of the service paths to which a communication may be classified. Each of the learning algorithms 607a-c may be generating using service network status information 602 and/or events of interest 604 representing the operational state of a service network (e.g., the service network 106) and communication information, such as call information 608, describing various characteristics of past communications to a call system (e.g., the call system 102) as training set data inputs. The learning algorithms 607a-c may be merged into a set of merged results 609, which may form the basis of an implicit model 610. As with the operations described in relation to the flow diagram 200, the implicit model 610 may be translated into an explicit model 612, which may be expressed as a set of rules 613, including human-readable rules 614 and/or curated rules 618. The human-readable rules 614, along with existing rules 616, may be analyzed and potentially modified by a human user to generate the curated rules 618. The rules 613 may be deployed by a rules engine 620 to classify incoming communications to the call system according to one of the service paths or to pre-emptively classify potential communications to the call system before the communication is received by the call system.

The service network status information 602, which may be the same or similar to the service network status information 202 in FIG. 2, may represent the operational state of the service network and may comprise status information received or accessed by the call system from the service network and/or received or accessed from the network information database 120. For example, the service network status information 602 may comprise error codes or diagnostic data sent by the customer premises equipment (e.g., the customer premises equipment 110). It is generally contemplated that the service network status information 602 is received from a significant number (e.g., fifty or more) of sources in the service network, including sources both in the infrastructure and/or the customer premises equipment.

The service network status information 602 may be analyzed to determine one or more events of interest 604, in the same or similar manner as the service network status information 202 is analyzed to determine one or more events of interest 204 in the flow diagram 200 of FIG. 2. For example, a signature(s) of error messages provided in the service network status information 602 may be analyzed by a feature detection algorithm to identify one or more events of interest 604, as described in relation to FIG. 3. Generally, the events of interest 604 may represent an abnormal or problematic state of the service network or portion thereof, particularly a state that may cause the caller to contact the call system regarding that problem. By identifying the events of interest 604 from the service network status information 602, the dimension of the domain space of the service network status information 602 may be reduced significantly, thereby facilitating an analysis by the learning algorithms 607*a-c* with regard to the operational state of the service network.

The call information 608, which may be the same or similar to the call information 208 in FIG. 2, comprises information on various characteristics of past calls to the call system. For example, the call information 608 may comprise the time of a communication and the subject matter or reason for the communication, such as to which of the service paths the communication was classified. The call information 608, and the subject matter or reason for the communication in particular, may be derived from an IVR system used to classify the communication. Additionally or alternatively, the call information 608 may be manually designated by a human user associated with the call system who, for example, reviews a text or voice message communicated by the caller describing why the caller is contacting the call system. The communication may accordingly be classified to one of the service paths based on the human user's designation. The classification by the human user may be maintained in the call information 608.

As described above with respect to the events of interest 204 and the call information 208 of FIG. 2, the events of interest 604 may be correlated with the call information 608 such that each event of interest in the events of interest 604 may be designated or tagged as causing (or otherwise being temporally associated with) a communication to the call system. Events of interest in the events of interest 604 that do not correlate with a communication in the call information 608 may be designated or tagged as not causing (or otherwise being temporally associated with) a communication to the call system. By correlating the communications in the call information 608 with the events of interest in the events of interest 604, the subject matter or reason for the communication included in the call information 608 may also be correlated with each event of interest that precipitated a communication.

The implicit model 610 may be determined, based at least in part, on the events of interest 604 and the call information 608. In particular, using various machine learning and/or data mining methods, including tree-based methods (e.g., decision trees or gradient boosted decision trees), a single supervised learning algorithm may be determined for each of the service paths. To illustrate, a first learning algorithm 607*a* may be determined for a first service path (e.g., the first learning algorithm 607*a* may be directed to predicting whether a communication or potential communication should be classified to the first service path), a second learning algorithm 607*b* may be determined for a second service path (e.g., the second learning algorithm 607*b* may be directed to predicting whether a communication or potential communication should be classified to the second service path), and an nth learning algorithm 607*c* may be determined for an nth service path (e.g., the nth learning algorithm 607*c* may be directed to predicting whether a communication or potential communication should be classified to the nth service path). Thus, the joined events of interest 604 and call information 608 may serve as training set inputs to each of the learning algorithms 607*a-c*, with each learning algorithm 607*a-c* being directed to predicting whether a communication or potential communication should be classified into a respective service path. For example, the events of interest 604 designated or tagged as being associated with (e.g., causing) a communication, which itself may indicate one of the service paths to which it was classified as per the call information 608 and the events of interest designated or tagged as not being associated with (e.g., causing) a communication may be used as a trained set input of each of the learning algorithms. This technique stands in contrast to other methods in which a single learning algorithm is determined for predicting which of a plurality of service paths a communication should be classified. Tests have demonstrated that the above described one learning algorithm: one service path method affords marked improvements over the contrasting one learning algorithm: a plurality of service paths method.

The results from the learning algorithms 607*a-c* may undergo a merge operation to determine the merged results 609. The merge operation may itself comprise a machine learning algorithm which learns how to switch between the individual learning algorithms 607*a-c*. The implicit model 610 may be determined according to the merged results 609. The implicit model 610 may model a prediction of which of the service paths a communication or potential communication should be classified. The implicit model 610, in turn, may be translated into the explicit model 612. The explicit model 612, for example, may be in the form of a human-readable decision tree.

The explicit model 612 may be expressed as the rules 613, which may comprise the human-readable rules 614. The rules 613 and/or the human-readable rules 614 may be the same or similar in form to the human-readable rules 214 of FIG. 2. To wit, the human-readable rules 614 may comprise one or more regular expressions in the form of: IF [condition(s)] THEN [result]. The [condition(s)] in the aforementioned form of regular expression may comprise one or more conditions relating to the operational state of the service network (e.g., relating to the events of interest 604) and the [result] may comprise an indication of which of the service paths a communication or potential communication should be classified.

As with the human-readable rules 214 of FIG. 2, the human-readable rules 614 may be analyzed and/or modified by a human user associated with the call system to determine the curated rules 618. The curated rules 618 may comprise existing rules 616, such as rules directed to home automation rules, caller preference rules, or rules relating to weather, traffic, the time of year, or the season. By allowing the human-readable rules 614 to be curated by a human user, the professional judgement of the human user may be easily brought to bear to improve the human-readable rules 614.

The rules 613, such as the curated rules 618, may be deployed in a rules engine 620 to determine which of the service paths a communication or potential communication should be sorted. The rules engine 620 may be used in a live call-taking environment, such as the call system and, in particular, the caller interface system 112. To apply the curated rules 618 to incoming communication or potential incoming communication, the rules engine 620 may receive or access real-time and/or recent service network status information 602 indicative of the operational state of the service network. The rules engine 620 may access or receive user information, such as caller information 606, which may indicate an identifier (e.g., name or account number) of a caller or potential caller, as well as a caller or potential caller's account details. The account details may comprise, for example, an indication of which services of the service network are associated with the account, the geographic location of the caller's associated customer premises equipment, the logical location (e.g., IP address) of the caller's associated customer premises equipment within the service network, and/or which portions of the infrastructure serve or are otherwise associated with the caller.

The rules engine 620 may apply one or more of the rules 613, such as the curated rules 618, to the service network status information 602 and determine which of the service paths a communication or potential communication should be classified. For example, if the service network status information 602 indicates that an Internet hub upstream from the caller is experiencing packet loss, the rules engine 620 may determine, via the rules 613, that the call should be routed to the service path for Internet access technical support. In this example, the rules engine 620 may use the caller information 606 to identify that the caller's account includes an Internet service package and that the customer premises equipment associated with the caller is downstream of the affected Internet hub.

The rules engine 620 may access or receive (additionally or alternatively to the service network status information 602) the events of interest 604 reflecting the real-time or recent operational state of the service network and apply the rules 613 to the events of interest 604. Thus, the real-time or recent service network status information 602 may be analyzed to determine one or more events of interest 604 reflecting the real-time or current operational state of the service network, which are then used by the rules engine 620 to determine which of the service paths a communication or potential communication should be classified.

If the rules engine 620 determines that a communication or potential communication should be classified to a certain service path, a message 622 may be generated indicating this determination. The message 622 may be received or accessed by the caller interface system, for example, and used to classify the respective communication into the service path indicated by the message 622. In the event that the communication has not yet been received by the call system 102, the message 622 may be held, such as for a pre-determined period of time, by the caller interface system until such time as the caller contacts the call system and the message 622 is used to route the communication to the service path indicated by the message 622.

It will be appreciated that the rules engine 620 may optionally implement the implicit model 610 and/or the explicit model 612 in the manner described above. The implementation of the implicit model 610 and/or the explicit model 612 by the rules engine 620 may be in addition or alternative to the implementation of the rules 613. Thus the rules implemented by the rules engine 620 do not necessarily have to be human-readable or modified by a human user.

It will be appreciated that the rules engine 620 and the rules engine 220 described in relation to FIG. 2 may function concurrently and cooperatively. For example, the rules engine 620 and the rules engine 220 may refer to a combined rules engine implementing both the rules directed towards predicting whether a communication is likely to be received by the call system and the rules directed towards determining which of the service paths the communication should be classified. Likewise, the message 622 and the message 222 from FIG. 2 may refer to a combined message which indicates whether the communication is likely to be received by the call system 102 and which of the service paths the communication should be classified.

Figure 7:
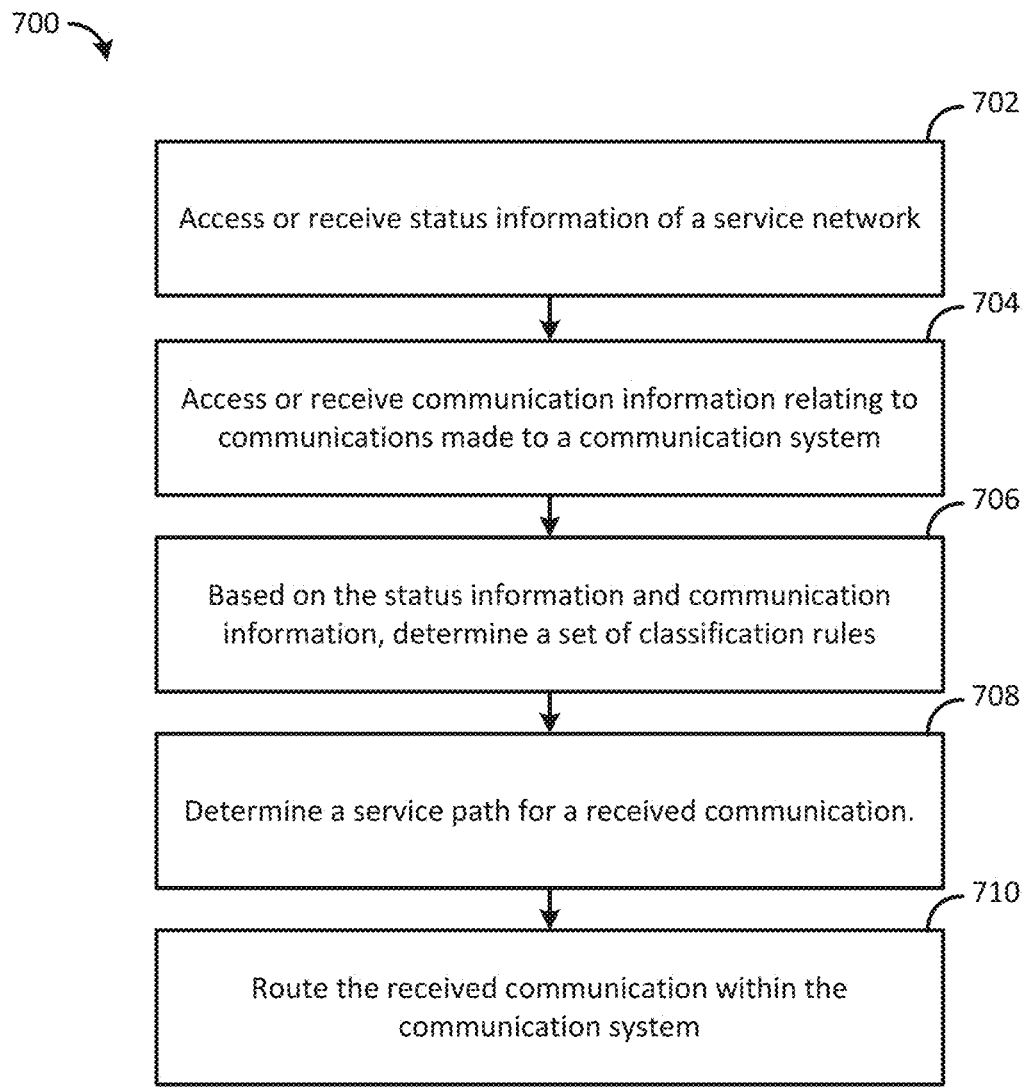
FIG. 7 shows an example method.

FIG. 7 shows, with additional reference to FIGS. 1 and 6, an example method 700 of routing a received communication (e.g., a call) within a communication system, such as a call system (e.g., the call system 102), based on a determined service path (e.g., the service path 114a-c). At step 702, status information (e.g., the service network status information 602) indicating an operational state of a service network (e.g., the service network 106) during a first time period may be received or accessed. As examples, the status information may indicate the technical state and/or operation of the various components of the service network, such as the infrastructure (e.g., the infrastructure 108) and/or customer premises equipment (e.g., the customer premises equipment 110). The status information may comprise error data indicative of an interruption of an operation of the service network.

At step 704, communication information, such as call information (e.g., the call information 608), may be accessed or received. The call information may indicate one or more communications received by the call system during the aforementioned first time period. The call information may comprise respective indications of when the communication was received (e.g., a time stamp), the identity of the caller (e.g., the caller 104) that performed the communication (and/or the user device (e.g., the user device 105) used to perform the communication), and the subject matter of the communication.

At step 706, based at least in part on the status information from step 702 and the call information from step 704, a set of classification rules may be determined. The classification rules may be usable to determine a service path according to which a communication may be routed. The classification rules may be embodied as the rules 613, the human-readable rules 614, the curated rules 618, or rules otherwise derived from the implicit model 610 and/or the explicit model 612. The call system (e.g., a rules engine) may receive inputs of current status information (e.g., the service network status information 602) reflecting a current operational state of the service network and/or a caller behavior profile (e.g., the caller information 606) of the caller performing the received call. The set of classification rules may be usable by the call system to process one or more of these inputs to determine a service path. The service path may be one of a plurality of distinct service paths and each of the distinct service paths may have a distinct set of classification rules associated therewith.

The set of classification rules may be determined based at least in part on an association of one or more events of interest (e.g., the events of interest 604) during the first time period and identified from the status information (e.g., error data) with the subject matter of the one or more communications indicated in the call information. For example, error data received from one or more cellular network base stations may be analyzed to identify time periods in which cellular service was interrupted with respect to those base stations. Those time periods and the temporally associated operational states of the service network may be correlated or associated with communications received by the call system during those time periods and concerning the interruption to cellular service. A detailed example of a technique to identify events of interests and determine an association with received calls is described with relation to FIG. 3.

At step 708, based at least in part on the set of classification rules, a service path (e.g., one of the service paths 114a-c) may be determined for a received communication to the call system. The service path may be determined during a second time period. The second time period may comprise the time period during which the communication is received by the call system. As such, the second time period may be after the first time period. The determination of the service path may be based at least in part on current status information reflecting the current operational state of the service network and/or the caller behavior profile of the caller performing the received communication.

At step 710, based at least in part on the service path determined in step 708, the received communication may be routed within the call system accordingly. For example, the received communication may be routed to an operator associated with the determined service path and that is capable of handling communications concerning the subject matter associated with the determined service path.

Figure 8:
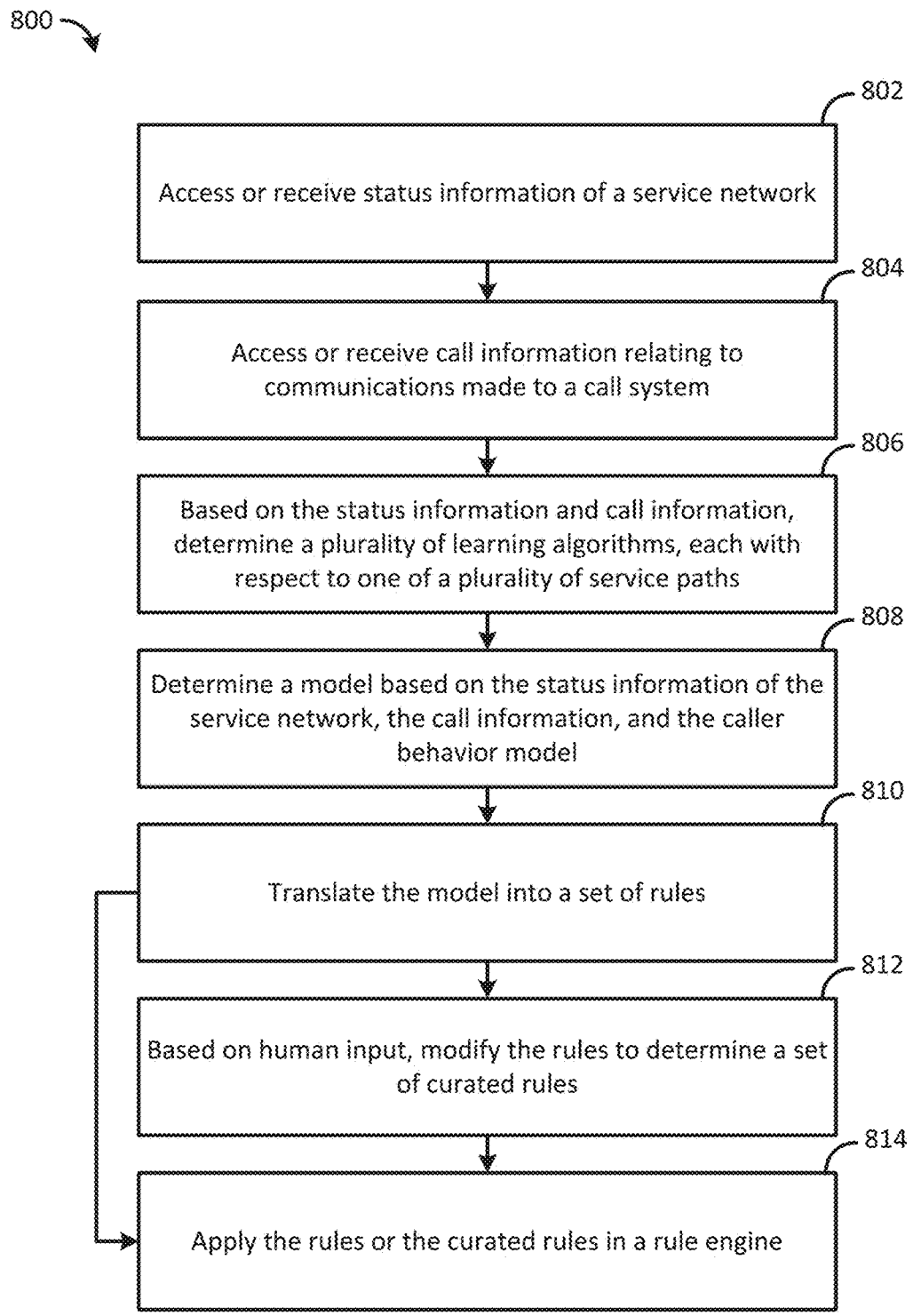
FIG. 8 shows an example method.

FIG. 8 shows, with additional reference to FIGS. 1 and 6, an example method 800 of determining a set of rules usable to classify a communication (e.g., a call) or potential communication to a service path (e.g., one of the service paths 114a-c) and implementing that set of rules via a rules engine. At step 802, status information of a service network (e.g., the service network status information 602 associated with the service network 106) may be received or accessed. The status information may indicate the operational state of the service network during a particular time period. For example, the status information may indicate the operational state of the service network during a time period previous to the time period during which a current communication or potential communication may be received by a call system (e.g., the call system 102). The call system may receive status information describing the operational state of the service network, including the technical state and/or operation of the infrastructure (e.g., the infrastructure 108) and customer premises equipment (e.g., the customer premises equipment 110). The status information of the service network may be stored in the network information database 120 and later accessed by the rules system 116. The status information of the service network may comprise, for example, signatures of error messages and/or diagnostic data.

At step 804, call information (e.g., the call information 608) describing past communications made to the call system may be accessed or received. The call information may be received by the call system, including the rules system 116. The call information may indicate one or more communications received by the call system during a time period previous to a time period during which a current communication or potential communication may be received by the call system (as referenced in step 814 below). This time period associated with the call information may partially or fully coincide with the time period reflected in the status information received or accessed in step 802. The call information may comprise, for example, an indication that each of the communications occurred, a timestamp of each of the communications, and information describing the subject matter or reason for each of the communications (e.g., to which of the service paths the communications were classified). The call information 608 may derive from interaction by a caller with an IVR system and/or interaction by a caller with a human user associated with the call system 102 (e.g., a call center operator). The human user may, for example, tag the communication in the call information with various characteristics of the communication, including the subject matter or reason for the communication.

At step 806, a plurality of learning algorithms (e.g., the learning algorithms 607a-c) may be determined using machine learning techniques, such as decision trees or gradient boosted decision trees. Each of the plurality of learning algorithms may be directed towards determining whether a communication or potential communication should be classified into one of a plurality of service paths. Each of the plurality of learning algorithms may be determined based, at least in part, on the service network status information received or accessed in step 802 and the call information received or accessed in step 804. In particular, the service network status information received or accessed in step 802 and the call information received or accessed in step 804 may serve as training set inputs for each of the learning algorithms.

At step 808, a model (e.g., the implicit model 610) may be determined based, at least in part, on the plurality of learning algorithms. For example, the learning algorithms may undergo a merge operation to form a set of merged results (e.g., the merged results 609). The merged results may accordingly be used as an at least partial basis for determining the implicit model. The implicit model may model a prediction of which of the service paths a communication or potential communication should be classified. The implicit model may be translated into an explicit model (e.g., the explicit model 612).

At step 810, the model of step 808 (e.g., the implicit model or the explicit model, as the case may be) may be translated into a set of rules, such as human-readable rules (e.g., the rules 603 and the human-readable rules 614, respectively). Thus, based at least in part on the status information received or accessed in step 802 and the call information received or accessed in step 804, a set of classification rules may be determined. The set of classification rules may be usable to determine a service path to which a communication is to be routed.

As an example, the human-readable rules may comprise one or more regular expressions in the form of IF [condition(s)] THEN [result], wherein the [condition(s)] may comprise one or more conditions relating to the operational state of the service network (e.g., relating to the events of interest 604) and the [result] may comprise an indication of which of the service paths a communication or potential communication should be classified.

At step 812, based on human input from a human user associated with the call system, the rules of step 810 (e.g., the human-readable rules) may be modified to determine a set of curated rules (e.g., the curated rules 618). For example, the human user may analyze the human-readable rules and modify the human-readable rules according to his or her professional judgement to form the curated rules. The curated rules may incorporate or be based on existing rules (e.g., the existing rules 616), in addition or alternative to the human-readable rules.

At step 814, the curated rules of step 812 may be applied in a rules engine (e.g., the rules engine 620) to determine which of the plurality of service paths a communication or potential communication should be classified or sorted. The determination of which of the plurality of service paths the communication or potential communication should be classified may be based on the current operational state of the service network (e.g., the service network status information 602). The determination of the service path may be based on a source identifier associated with a user device (e.g., the user device 105) used by the caller. The source identifier may be associated with the caller and thus may be used to determine the identity of the caller.

Additionally or alternatively to the curated rules of step 812, the rules of step 810 (e.g. the rules 613 and/or the human-readable rules 614) may be applied in the rules engine. The application of the curated rules (or the rules and/or the human-readable rules, as the case may be) may be based on caller information (e.g., the caller information 606) reflecting various characteristics of the caller and his or her account with the service network. The various characteristics of the call and his or her account may comprise, for example, an indication of which services the caller is subscribed to or a geographical or logical location within the service network. Accordingly, the step 814 may comprise receiving or accessing the service network status information 602 reflecting the current operational state of the service network and/or the caller information and using at least a portion of this data as input to one or more of the rules of the rules engine, with the result being a determination of which service path a communication or potential communication should be classified.

Responsive to determining which service path the communication or potential communication should be routed, the communication may accordingly be routed to the determined service path. For example, this may comprise routing the communication to a call system operator trained to address the subject matter of the communication.

Figure 9:
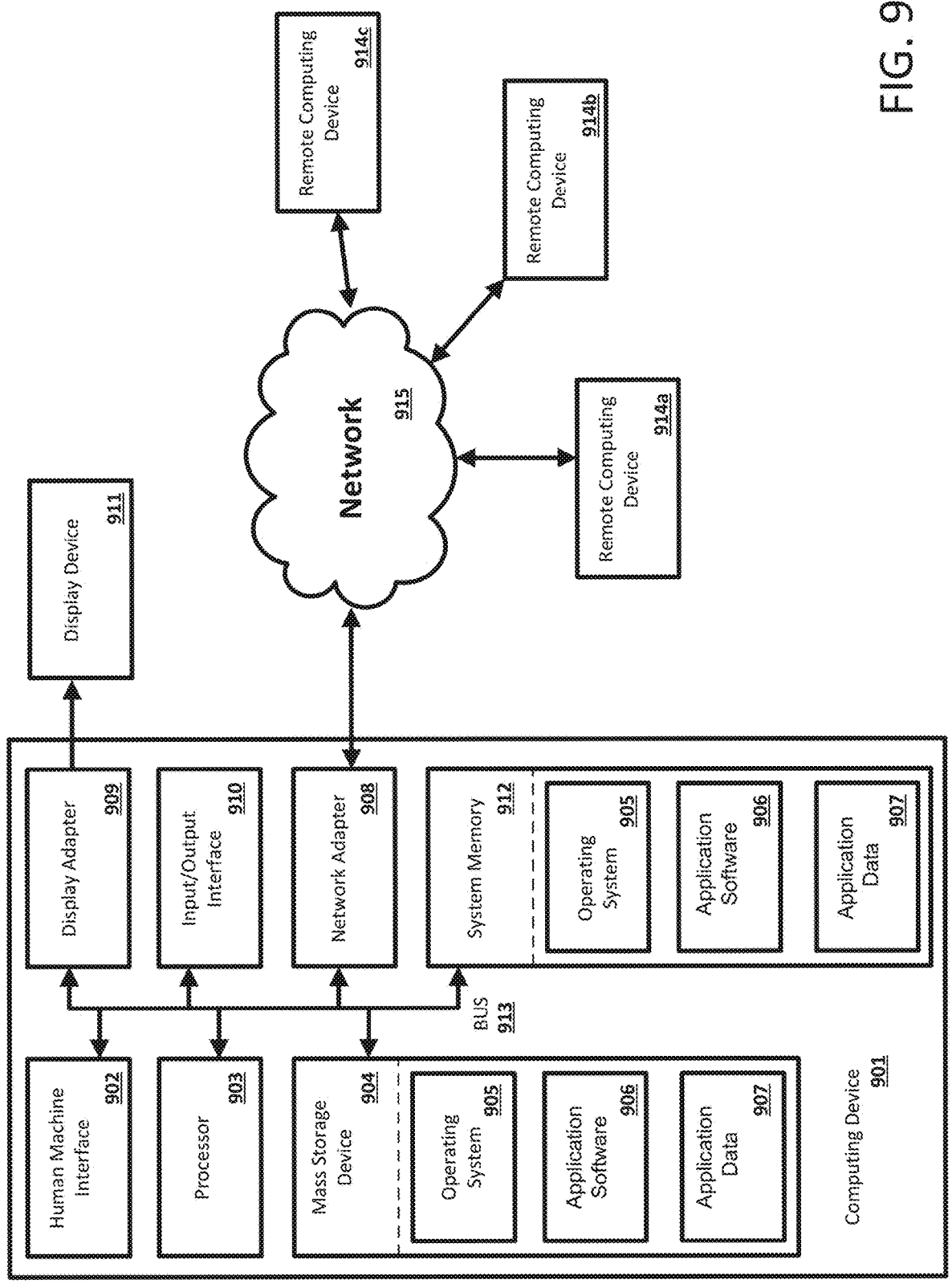
FIG. 9 shows a schematic diagram of an example computing system.

The methods and systems may be implemented on a computing system such as computing device 901 as shown in FIG. 9 and described below. By way of example, one or more of the call system 102, caller interface system 112, the rules system 116, and various components of the service network 106 of FIG. 1 may be a computer as shown in FIG. 9. Similarly, the methods and systems described herein may utilize one or more computers to perform one or more functions in one or more locations. FIG. 9 is a block diagram showing an exemplary operating environment for performing the described methods. This exemplary operating environment is only an example of an operating environment and is not intended to suggest any limitation as to the scope of use or functionality of operating environment architecture. Neither should the operating environment be interpreted as having any dependency or requirement relating to any one or combination of components shown in the exemplary operating environment.

The present methods and systems may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Other examples comprise set top boxes, home automation hubs, programmable consumer electronics, network PCs, minicomputers, mainframe computers, distributed computing environments that comprise any of the above systems or devices, and the like.

The processing of the described methods and systems may be performed by software components. The systems and methods may be described in the general context of computer-executable instructions, such as program modules, being executed by one or more computers or other devices. Generally, program modules comprise computer code, routines, programs, objects, components, data structures, etc. that perform particular tasks or implement particular abstract data types. The described methods may also be practiced in grid-based and distributed computing environments where tasks are performed by remote processing devices that are linked through a communications network. In a distributed computing environment, program modules may be located in both local and remote computer storage media including memory storage devices.

One skilled in the art will appreciate that the systems and methods described herein may be implemented via a general-purpose computing device in the form of a computing device 901. The components of the computing device 901 may comprise, but are not limited to, one or more processors or processing units 903, a system memory 912, and a system bus 913 that couples various system components including the processor 903 to the system memory 912. In the case of multiple processing units 903, the system may utilize parallel computing.

The system bus 913 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 913, and all buses specified in this description may also be implemented over a wired or wireless network connection and each of the subsystems, including the processor 903, a mass storage device 904, an operating system 905, application software 906, application data 907, a network adapter 908, system memory 912, an Input/Output Interface 910, a display adapter 909, a display device 911, and a human machine interface 902, may be contained within one or more remote computing devices 914a-c at physically separate locations, connected through buses of this form, in effect implementing a fully distributed system.

The computing device 901 typically comprises a variety of computer readable media. Exemplary readable media may be any available media that is accessible by the computing device 901 and comprises, for example and not meant to be limiting, both volatile and non-volatile media, removable and non-removable media. The system memory 912 comprises computer readable media in the form of volatile memory, such as random access memory (RAM), and/or non-volatile memory, such as read only memory (ROM). The system memory 912 typically contains data such as application data 907 (e.g., the caller information database 118 and/or the network information database 120) and/or program modules such as operating system 905 and application software 906 (e.g., applications configured to implement at least a portion of any method described herein including the methods 400, 500, 700, and 800 described in relation, respectively, to FIGS. 4, 5, 7, and 8) that are immediately accessible to and/or are presently operated on by the processing unit 903.

The computing device 901 may also comprise other removable/non-removable, volatile/non-volatile computer storage media. By way of example, FIG. 9 shows a mass storage device 904 which may comprise non-volatile storage of computer code, computer readable instructions, data structures, program modules, and other data for the computing device 901. For example and not meant to be limiting, a mass storage device 904 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 904, including by way of example, an operating system 905 and application software 906. Each of the operating system 905 and application software 906 (or some combination thereof) may comprise elements of the programming and the application software 906. Application data 907 may also be stored on the mass storage device 904. Application data 907 may be stored in any of one or more databases known in the art. Examples of such databases comprise, DB2®, Microsoft® Access, Microsoft® SQL Server, Oracle®, my SQL, PostgreSQL, and the like. The databases may be centralized or distributed across multiple systems.

The user may enter commands and information into the computing device 901 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices may be connected to the processing unit 903 via a human machine interface 902 that is coupled to the system bus 913, but may be connected by other interface and bus structures, such as a parallel port, game port, an IEEE 1394 Port (also known as a Firewire port), a serial port, or a universal serial bus (USB).

A display device 911 may also be connected to the system bus 913 via an interface, such as a display adapter 909. It is contemplated that the computing device 901 may have more than one display adapter 909 and the computing device 901 may have more than one display device 911. For example, a display device may be a monitor, an LCD (Liquid Crystal Display), or a projector. In addition or alternative to the display device 911, other output peripheral devices may comprise components such as speakers (not shown) and a printer (not shown) which may be connected to the computing device 901 via Input/Output Interface 910. Any step and/or result of the methods may be output in any form to an output device. Such output may be any form of visual representation, including, but not limited to, textual, graphical, animation, audio, tactile, and the like. The display 911 and computing device 901 may be part of one device, or separate devices.

The computing device 901 may operate in a networked environment using logical connections to one or more remote computing devices 914a-c. By way of example, a remote computing device may be a personal computer, portable computer, a smart phone, a server, a router, a network computer, a peer device or other common network node, and so on. Logical connections between the computing device 901 and a remote computing device 914a-c may be made via a network 915, such as a local area network (LAN) and a general wide area network (WAN). Such network connections may be through a network adapter 908. A network adapter 908 may be implemented in both wired and wireless environments. Such networking environments are conventional and commonplace in dwellings, offices, enterprise-wide computer networks, intranets, and the Internet.

For purposes of illustration, application programs and other executable program components such as the operating system 905 are shown herein as discrete blocks, although it is recognized that such programs and components reside at various times in different storage components of the computing device 901, and are executed by the data processor(s) of the computer. An implementation of application software 906 may be stored on or transmitted across some form of computer readable media. Any of the described methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another example includes from the one particular value and/or to the other particular value. Similarly, when values are expressed as approximations, by use of the antecedent "about," it will be understood that the particular value forms another example. It will be understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal implementation. "Such as" is not used in a restrictive sense, but for explanatory purposes.

Described are components that may be used to perform the described methods and systems. These and other components are described herein, and it is understood that when combinations, subsets, interactions, groups, etc. of these components are described that while specific reference of each various individual and collective combinations and permutation of these may not be explicitly described, each is specifically contemplated and described herein, for all methods and systems. This applies to all aspects of this application including, but not limited to, steps in described methods. Thus, if there are a variety of additional steps that may be performed it is understood that each of these additional steps may be performed with any specific example or combination of examples of the described methods.

As will be appreciated by one skilled in the art, the methods and systems may take the form of an entirely hardware implementation, an entirely software implementation, or an implementation combining software and hardware aspects. The methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Examples of the methods and systems are described herein with reference to block diagrams and flowcharts of methods, systems, apparatuses and computer program products. It will be understood that each block of the block diagrams and flowcharts, and combinations of blocks in the block diagrams and flowcharts, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowcharts support combinations of means for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

While the methods and systems have been described in connection with specific examples, it is not intended that the scope be limited to the particular examples set forth, as the examples herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of examples described in the specification.

It will be apparent to those skilled in the art that various modifications and variations may be made without departing from the scope or spirit. Other implementations will be apparent to those skilled in the art from consideration of the specification and practice described herein. It is intended that the specification and examples be considered as exemplary only, with a true scope and spirit being indicated by the following claims.

What is claimed:

1. A method comprising:
   receiving status information indicating an operational state of a service network during a first time period;
   receiving communication history information indicating one or more communications received by a communication system associated with the service network, wherein the communication history information indicates a subject matter of each of the one or more communications;
   determining, based at least in part on the status information and the communication history information, a probability that the communication system will receive a communication from a first source during a second time period; and
   transmitting, based on a determination that the probability satisfies a threshold, a notification to the first source indicating an operational state of the service network during the second time period.

2. The method of claim 1, further comprising:
   receiving user information indicating a usage of the communication system associated with the first source, wherein the determining the probability is further based at least in part on the user information.

3. The method of claim 1, wherein the one or more communications received by the communication system and indicated by the communication history information are received during the first time period.

4. The method of claim 1, wherein the second time period is after the first time period.

5. The method of claim 1, further comprising:
   transmitting, based on the determination that the probability satisfies the threshold, the notification to a second source indicating an operational state of the service network during the second time period.

6. The method of claim 1, wherein the notification comprises at least one of a voice message, an email, an on-screen television notification, or a short message service (SMS) text message.

7. The method of claim 1, wherein the status information comprises error data indicative of an interruption of an operation of the service network.

8. The method of claim 1, wherein the status information comprises error data received from the service network and indicative of at least one operational parameter of the service network, the method further comprising:
   identifying, based at least in part on the error data, an event of interest corresponding to the operational state of the service network during the first time period; and
   determining an association between the subject matter of one or more communications indicated in the communication history information and the event of interest, wherein determining the probability is further based at least in part on the determined association.

9. The method of claim 1, wherein the first source comprises a user device.

10. A method comprising:
    receiving status information indicating an operational state of a service network, wherein the operational state is associated with a time period;
    receiving predictive communication information indicating a probability that a communication system associated with the service network will receive a communication from a first source during the time period; and
    transmitting, based on the status information and the predictive communication information, a notification to the first source indicating the operational state of the service network.

11. The method of claim 10, wherein the notification comprises at least one of a voice message, an email, an on-screen television notification, or a short message service (SMS) text message.

12. The method of claim 10, wherein transmitting the notification comprises calling, by an operator associated with the communication system, the first source.

13. The method of claim 10, further comprising:
transmitting, based on the status information and the predictive communication information, the notification to a second source indicating an operational state of the service network during the time period.

14. The method of claim 10, wherein the first source comprises a user device.

15. A method comprising:
receiving status information indicating an operational state of a service network during a first time period;
receiving communication history information indicating one or more communications received by a communication system associated with the service network and received during the first time period, wherein the communication history information indicates a subject matter of the one or more communications;
determining, based at least in part on the status information and the communication history information, a set of classification rules;
determining, based at least in part on the set of classification rules and during a second time period different from the first time period, a service path for a received communication; and
routing, based at least on the service path, the received communication within the communication system.

16. The method of claim 15, wherein the set of classification rules comprises a human-readable rule.

17. The method of claim 15, wherein a source identifier is associated with the received communication and wherein the determining the service path for the received communication is further based on the source identifier.

18. The method of claim 15, wherein the status information comprises error data indicative of an interruption of an operation of the service network.

19. The method of claim 15, wherein the status information comprises error data received from the service network and indicative of at least one operational parameter of the service network, the method further comprising:
identifying, based at least in part on the error data, an event of interest corresponding to the operational state of the service network during the first time period; and
determining an association between the subject matter of one or more communications indicated in the communication history information and the event of interest, wherein determining the set of classification rules is further based at least in part on the association.

20. The method of claim 15, wherein the service path is one of a plurality of distinct service paths within the communication system, and wherein each of the distinct service paths has a distinct set of classification rules associated therewith.

* * * * *